United States Patent Office 2,931,721
Patented Apr. 5, 1960

2,931,721

REGENERATION OF REACTOR FUEL ELEMENTS

Ward L. Lyon, Richland, Wash., assignor to the United States of America as represented by the United States Atomic Energy Commission No Drawing. Application June 20, 1958
Serial No. 743,479

4 Claims. (Cl. 75—84.1)

This invention deals with a process of regenerating metallic fuel elements containing plutonium and/or uranium as the fissionable material, and in particular with aluminum alloys containing said fissionable material.

Aluminum alloys of the type described are used, for instance, as the fuel material of power reactors, such as the so-called plutonium recycle test reactor; this reactor is described, for instance, in report HW–50700 published by General Electric Company. In these reactors the fissionable material is burned up usually to a maximum degree of about 50%, but preferably to a lesser extent. The quasi depleted aluminum alloys have to be reconditioned for economical reasons, that is, the plutonium content has to be brought up to a higher level to make the alloys suitable for reuse in reactors.

It is an object of this invention to provide a process for the concentration of uranium or plutonium in aluminum alloys wherein an intermediate step of forming an aqueous solution is not necessary.

Another object of this invention is a process for concentrating plutonium or uranium in aluminum alloys that have been subjected to neutron bombardment in a neutronic reactor which process requires handling of small volumes of masses only, so that the process can be operated in a small plant space and with relatively little shielding.

It is still another object of this invention to provide a process for concentrating plutonium or uranium in neutron-bombarded fission-products-containing aluminum alloys in which the fission products are obtained in a highly concentrated form so that their disposal is comparatively easy.

It is finally also an object of this invention to provide a process for concentrating plutonium or uranium in neutron-bombarded aluminum alloys in which process the fuel alloy is retained in the metallic state during reconditioning so that steps of metal production are not necessary.

These objects are accomplished by reacting the aluminum alloy containing the plutonium and/or uranium with a metal halide at elevated temperature whereby aluminum halide is formed and volatilized or sublimed and a residual alloy is obtained which contains the plutonium and/or uranium in a higher concentration. Zinc chloride and aluminum fluoride are halides that were found particularly well suited for the process of this invention. The quantity added determines the amount of aluminum removed in the form of the halide.

According to one embodiment of this invention, zinc chloride is added to the plutonium-aluminum alloy or uranium-aluminum alloy, and the reaction mass is then heated stepwise up to a temperature of at least 1000° C. When the temperature reaches 450 to 500° C., the zinc chloride melts and reacts with the solid alloy, forming aluminum chloride; the latter sublimes. At higher temperatures, at about 650° C., a zinc metal alloy formed with the aluminum alloy. At the maximum temperature of approximately 1000° C. or higher, the zinc metal and any unreacted zinc chloride volatilize and an aluminum alloy highly concentrated in plutonium and/or uranium is obtained. This last step of volatilization is preferably carried out under reduced pressure.

It is advisable to add the zinc chloride in a quantity less than stoichiometric, that is less than that required for conversion of all of the aluminum to the chloride, because then the plutonium substantially remains in the metallic state. However, any small amount of plutonium chloride that is formed is reconverted to the metal, because it will react with aluminum and the formed aluminum chloride will volatilize; thus, a new amount of plutonium chloride will steadily be reduced by the aluminum as the aluminum chloride volatilizes which eventually results in the reconversion of all of the plutonium chloride formed to the metal.

According to a second embodiment of this invention, aluminum fluoride, per se or in the form of an aluminum fluoride-containing material, such as cryolite, is added to the aluminum alloy material. In this embodiment it is more advantageous to melt the metal and maintain the aluminum fluoride in the solid state, because, if the fluoride is also melted, the reaction takes place too rapidly and the melt is blown out of the reaction container. Thus the temperature range best suitable for the reaction with the aluminum fluoride is that of between 800 and 1000° C. Also in this case the use of a vacuum is advantageous. The aluminum fluoride reacts with the aluminum metal and forms aluminum subfluoride, AlF, which at the temperature used sublimes away from the alloy, leaving an alloy which is more concentrated in the fissionable material than that used for regeneration.

In the process of this invention a substantial part of the fission products formed during and after neutron bombardment are removed from the alloy. Some fission products, in particular those that form volatile halides, are evaporated together with the aluminum halide formed. Others are oxidized and then form a scum on the surface of the alloy; these are particularly strontium, yttrium, cesium and barium, in other words the alkali and alkaline metals and also yttrium. Fission products predominantly retained in the aluminum alloy are zirconium, niobium, ruthenium, rhodium, cerium and praseodymium, and other rare earth metals present. In the case of $AlF_3$ contained in molten cryolite as the halide, for instance, $Cs^{137}$, $Ba^{137}$ and $Sr^{90}$ were extracted to a degree corresponding to a decontamination factor of at least $10^3$, while $Ru^{106}$—$Rh^{106}$ and $Zr^{95}$—$Nb^{95}$ were removed by a factor of about 10. Altogether only about 5% of the gamma activity present in the alloy had been retained in the metal.

As has been mentioned, the process is equally well suitable for the regeneration of aluminum-uranium and for that of aluminum-plutonium alloys. It is also applicable to the same alloys which additionally contain silicon metal. When the process is applied to the silicon-containing fuel materials, the silicon is volatilized as the chloride or the fluoride.

In the following, the process of this invention is illustrated by way of example.

*Example I*

About 1.2 gm. of an aluminum-plutonium alloy containing approximately 10% by weight of plutonium is heated with 0.4 gm. of aluminum fluoride to about 900° C. while the reaction vessel is being evacuated. After the reaction temperature has been maintained for 30 minutes, heating is discontinued and the alloy is cooled to room temperature. The alloy obtained contains about 12.5% plutonium.

*Example II*

Another 1.2-gm. portion of the same aluminum-plutonium alloy as used in Example I is heated to 480° C. after about 4 gm. of zinc chloride have been added. This temperature of 480° C. is maintained for about 10 minutes, and then the temperature is gradually increased to about 1000° C. while the pressure is being reduced. When volatilization is complete the residual alloy contains about 17% by weight of plutonium.

It will be understood that this invention is not to be limited to the details given herein, but that it may be modified within the scope of the appended claims.

What is claimed is:

1. A process for concentrating an actinide metal selected from the group consisting of plutonium, uranium and a mixture of plutonium and uranium, in an aluminum alloy containing said actinide, comprising adding zinc chloride to said aluminum alloy, and heating the mixture obtained to at least 1000° C. whereby aluminum chloride and zinc metal are formed and volatilized away from a residual alloy containing the actinide metal in a higher concentration.

2. The process of claim 1 wherein heating is carried out while the pressure is reduced.

3. A process for concentrating an actinide metal selected from the group consisting of plutonium, uranium and a mixture of plutonium and uranium, in an aluminum alloy containing said actinide, comprising adding aluminum fluoride to said aluminum alloy, and heating the mixture obtained to a temperature of between 800 and 1000° C. while reducing the pressure to subatmospheric level whereby aluminum subfluoride is formed and volatilized away from a residual alloy containing the actinide metal in a higher concentration.

4. The process of claim 3 wherein the aluminum fluoride is added as cryolite.

References Cited in the file of this patent

CRC–636, Some Experiments Related to the Processing of Plutonium-Aluminum Alloy by High Temperature Methods, Chalk River Project, Atomic Energy of Canada, Ltd., pages 3, 4, 5, April 1956.

HW–52,000, Annual Report, Plutonium Recycle Program, Fiscal Year 1957, Hanford Labs., Richland, Wash., September 20, 1957, page 31.